(12) United States Patent
Lee

(10) Patent No.: US 8,000,299 B2
(45) Date of Patent: Aug. 16, 2011

(54) METHOD AND APPARATUS FOR PROVIDING AND OBTAINING INFORMATION REGARDING LOCAL AGENT IN WIRELESS NETWORK

(75) Inventor: Kyung-geun Lee, Yongin-si (KR)

(73) Assignees: Sejong Industry—Academy Cooperation Foundation, Seoul (KR); Samsung Electronics Co., Ltd., Suwon-si (KR)

( * ) Notice: Subject to any disclaimer, the term of this patent is extended or adjusted under 35 U.S.C. 154(b) by 574 days.

(21) Appl. No.: 11/297,393

(22) Filed: Dec. 9, 2005

(65) Prior Publication Data
US 2006/0153136 A1 Jul. 13, 2006

(30) Foreign Application Priority Data
Jan. 8, 2005 (KR) .................. 10-2005-0001953

(51) Int. Cl.
*H04W 4/00* (2009.01)

(52) U.S. Cl. ...... 370/331; 455/436; 455/440; 455/422.1

(58) Field of Classification Search .................. 455/449, 455/437, 444, 432.3; 370/328
See application file for complete search history.

(56) References Cited

U.S. PATENT DOCUMENTS

| | | | | |
|---|---|---|---|---|
| 6,584,098 | B1 * | 6/2003 | Dutnall | 370/354 |
| 7,031,328 | B2 * | 4/2006 | Thubert et al. | 370/401 |
| 2001/0046223 | A1 * | 11/2001 | Malki et al. | 370/338 |
| 2004/0018841 | A1 * | 1/2004 | Trossen | 455/436 |
| 2004/0072569 | A1 * | 4/2004 | Omae et al. | 455/445 |
| 2004/0105408 | A1 * | 6/2004 | Suh et al. | 370/331 |
| 2004/0179508 | A1 | 9/2004 | Thubert et al. | |
| 2004/0218573 | A1 | 11/2004 | Takahashi et al. | |
| 2005/0272481 | A1 * | 12/2005 | Kim | 455/574 |

* cited by examiner

*Primary Examiner* — Kamran Afshar
*Assistant Examiner* — Vladimir Magloire
(74) *Attorney, Agent, or Firm* — Staas & Halsey LLP

(57) ABSTRACT

A method and apparatus for providing and obtaining information includes detecting information regarding a local agent, representative of a mobile node in a predetermined area, from a message from an access router; requesting the information from a node other than the access router, dependent upon whether the information is detected or not; and obtaining the information by receiving a response to the request.

26 Claims, 11 Drawing Sheets though, as each, the mobile node 21 is covered by the MAP 24, the mobile node 21 needs only to perform the binding process with the MAP 24. Thus, it can hide its mobility from the home agent 25 or the correspondent node 26, thereby reducing binding procedures with the home agent 25, as defined in MIPv6 and reducing the handover time.

METHOD AND APPARATUS FOR PROVIDING AND OBTAINING INFORMATION REGARDING LOCAL AGENT IN WIRELESS NETWORK

CROSS-REFERENCE TO RELATED APPLICATIONS

This application claims the priority of Korean Patent Application No. 2005-1953, filed on Jan. 8, 2005 in the Korean Intellectual Property Office, the disclosure of which is incorporated herein in its entirety by reference.

BACKGROUND OF THE INVENTION

1. Field of the Invention

Aspects of the present invention relate to a method and apparatus for supporting the mobility of a mobile node under a mobile Internet protocol version 6 (MIPv6) environment, especially under a hierarchical MIPv6 (HMIPv6) environment.

2. Description of the Related Art

As wireless communication has been in great demand in recent years, various new wireless Internet networks, as well as existing mobile networks and wireless LANs, appear in succession. In particular, improvements in the performance of mobile terminals, such as portable phones, personal digital assistants (PDAs), laptop computers, etc., and technological development of wireless communication allow users to expect the same high-quality Internet service in a wireless environment that they have so far experienced in a wired environment with desktop computers.

Meanwhile, in order to use existing Internet services, the mobility of mobile terminals should be supported in Internet protocol (IP) based Internet networks. In particular, mobility should be supported not only in physical and link layers, but also in IP layers. With this background, a representative protocol, MIPv6, has been developed.

FIG. 1 shows a configuration of a conventional MIPv6. Referring to FIG. 1, the conventional MIPv6 environment comprises a mobile node (MN) 11, a home agent (HA) 12, a foreign agent (FA) 13, and a correspondent node (CN) 14.

The mobile node 11 moves from a home network managed by the home agent 12 into a subnet managed by the foreign agent 13, at which time the mobile node 11 generates a Care of Address (CoA), which is an IP address, to be used in the subnet. The mobile node 11 sends a Binding Update (BU) message to the home agent 12 to inform it of the CoA, and it in turn receives a Binding Acknowledgement (BA) message from the home agent 12. Through such a binding process, the mobile node 11 can maintain connectivity with the home agent 12 or the correspondent node 14. When the correspondent node 14 sends data to a previous address of the mobile node 11, the home agent 12 snatches the data and transfer it to the present address of the mobile node 11 located in the subnet managed by the foreign agent 13.

However, if the mobile node 11 is at a far distance from the home agent 12, it takes a long time to perform the binding process, and thus the mobile node 11 is likely to lose its connectivity with the correspondent node 14, resulting in data loss and transmission delay. To solve this problem, a method of localized mobility management has been suggested. According to the method, a shift of the mobile node 11 into a new subnet will avoid influencing, as much as possible, the binding of the mobile node 11 with the home agent 12 or the correspondent node 14.

An exemplary scheme known to those skilled in the art to implement the method of localized mobility management is hierarchically configured MIPv6 (HMIPv6). Under the HMIPv6, every predefined area having a plurality of subnets sets up a mobile anchor point (MAP), a local agent that is representative of a mobile node in the predefined area. The MAP is in charge of the mobility of the mobile node in the predefined area, so as to hide the mobility of the mobile node from a home agent or a correspondent node.

FIG. 2 shows the configuration of a conventional HMIPv6. Referring to FIG. 2, the conventional HMIPv6 environment comprises a mobile node 21, access routers (ARs) 22 and 23, a mobile anchor point (MAP) 24, a home agent 25, and a correspondent node 26.

The mobile node 21 moves from a subnet managed by the access router 23 to another subnet managed by the access router 22. At this time, the mobile node 21 obtains information regarding the MAP 24 from a router advertisement message from the access router 22 that manages the subnet where the mobile node 21 is now located. The mobile node 21 performs a binding process with the MAP 24 by using a Local CoA (LCoA) generated by the mobile node 21 and a Regional CoA (RCoA) included in the information regarding the MAP 24. RCoA is an IP address of the MAP 24, but is recognized as an IP address of the mobile node 21 by the home agent 25 or the correspondent node 26. Therefore, as long as the mobile node 21 moves between subnets within an area covered by the MAP 24, the mobile node 21 needs only to perform the binding process with the MAP 24. Thus, it can hide its mobility from the home agent 25 or the correspondent node 26, thereby reducing binding procedures with the home agent 25, as defined in MIPv6 and reducing the handover time.

However, in the case where the access router 22 of a subnet into which the mobile node 21 has just moved does not support HMIPv6-based functions, that is, the access router 22 does not include MAP options, the mobile node 21 cannot obtain information regarding the MAP 24 and the connection between the mobile node 21 and the home agent 25 is terminated. Since not all access routers of all networks guarantee to support HMIPv6-based functions, measures for solving the problem in this case are needed.

SUMMARY OF THE INVENTION

Aspects of the present invention provide a method and an apparatus for supporting the mobility of a mobile node regardless of whether an access router can support HMIPv6-based functions, and also provides a recording medium, accessible by the computer, which stores a program to implement the same method.

According to an aspect of the present invention, there is provided a method of obtaining information, comprising detecting information regarding a local agent, representative of a mobile node in a predetermined area, from a message from an access router; requesting the information from a node other than the access router, dependent upon whether the information is detected or not; and obtaining the information by receiving a response to the request.

According to an aspect of the present invention, if the information is not detected, requesting the information is performed by requesting the information from another local agent other than the local agent in the predetermined area.

According to an aspect of the present invention, the local agent and another local agent are connected in an overlay network, and share the information with each other.

According to an aspect of the present invention, if the information is not detected, requesting the information is performed by requesting the information from a server that contains the information.

According to an aspect of the present invention, the method further comprises, on the basis of the information obtained from the response to the request, selectively updating the mobile node's binding to the local agent.

According to an aspect of the present invention, the information is an address of the local agent, and wherein selectively updating the binding is performed by mapping an address of the mobile node to the address of the local agent.

According to an aspect of the present invention, the local agent is a Hierarchical Mobile IPv6 (HMIPv6) based Mobile Anchor Point (MAP), and wherein detecting the information is achieved only when the access router supports HMIPv6-based functions.

According to another aspect of the present invention, there is provided a recording medium storing a program to implement a method of obtaining information, the method comprising: detecting information regarding a local agent, representative of a mobile node in a predetermined area, from a message from an access router; requesting information from a node other than the access router, dependent upon whether the information is detected or not; and obtaining information by receiving a response to the request.

According to still another aspect of the present invention, there is provided an apparatus for obtaining information, comprising: an information detecting unit that detects information regarding a local agent that is representative of a mobile node in a predetermined area from a message from an access router; an information requesting unit that requests the information from a node other than the access router, dependent upon whether the information detecting unit detects the information or not; and an information obtaining unit that obtains the information by receiving a response to the request sent by the information requesting unit.

According to yet another aspect of the present invention, there is provided a method of providing information, comprising: receiving a request for information regarding a local agent that is representative of a mobile node in a predetermined area; and sending the information to respond to the request.

According to an aspect of the present invention, the method further comprises: receiving the information from the local agent.

According to an aspect of the present invention, the local agent and the other local agent performing the method of providing information are connected to each other in an overlay network, and wherein receiving the information is performed by receiving the information from the other local agent.

According to an aspect of the present invention, the method further comprises using the received information to update information stored.

According to an aspect of the present invention, wherein the information includes an address of the local agent and subnet identifiers in the predetermined area, and the method further comprises: comparing an identifier of the subnet where the mobile node is now located with subnet identifiers stored, if the request is received, wherein sending the information to respond to the request is performed by sending information including an address mapped to the identifier of the subnet where the mobile node is now located.

According to an aspect of the present invention, the local agent is an HMIPv6-based MAP, and wherein receiving the request for the information regarding the local agent is achieved when an access router connected to the mobile node does not support HMIPv6-based functions.

According to further aspect of the present invention, there is provided a recording medium storing a program to implement a method of providing information, the method comprising: receiving a request for information regarding a local agent that is representative of a mobile node in a predetermined area; and sending the information to respond to the request.

According to further aspect of the present invention, there is provided an apparatus for providing information, comprising: a request receiving unit that receives a request for information regarding a local agent that is representative of a mobile node in a predetermined area; and an information sending unit that sends the information to respond to the request received by the request receiving unit.

According to further aspect of the present invention, there is provided a method of providing and obtaining information, comprising: detecting information regarding a local agent that is representative of a mobile node in a predetermined area from a message from an access router and, according to the detection result, requesting the information from a node other than the access router; and receiving the request, then sending the information to respond to the request.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
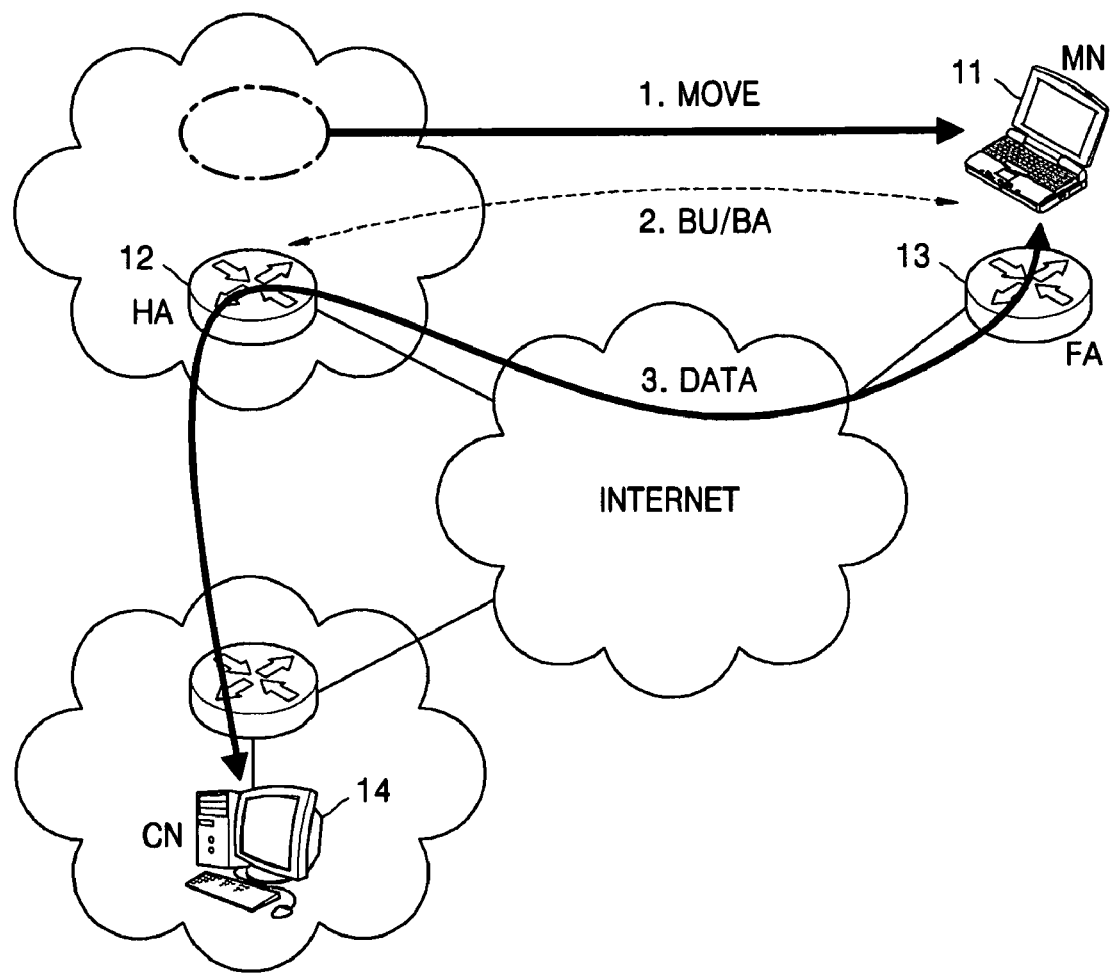
FIG. 1 shows the configuration of a conventional MIPv6 environment.
Figure 2:
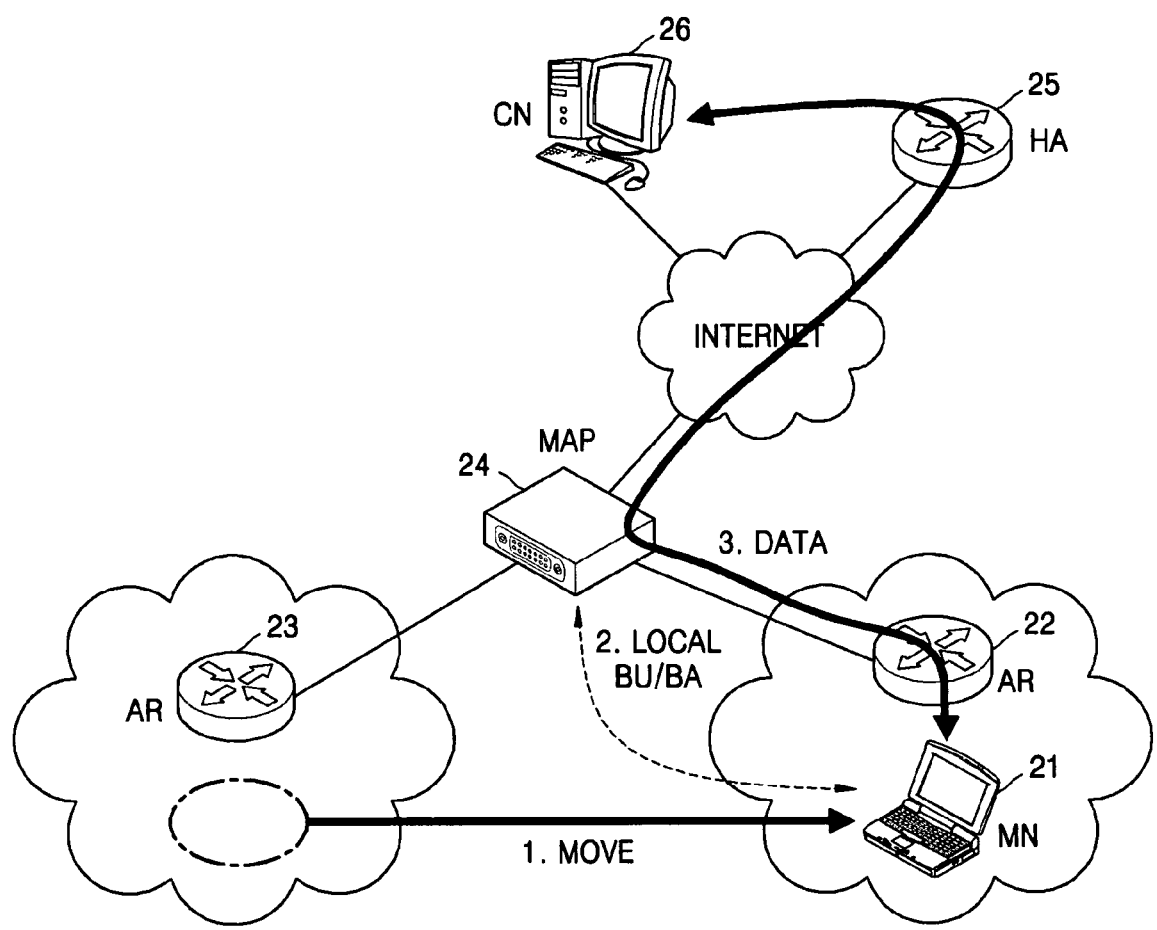
FIG. 2 shows the configuration of a conventional HMIPv6 environment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
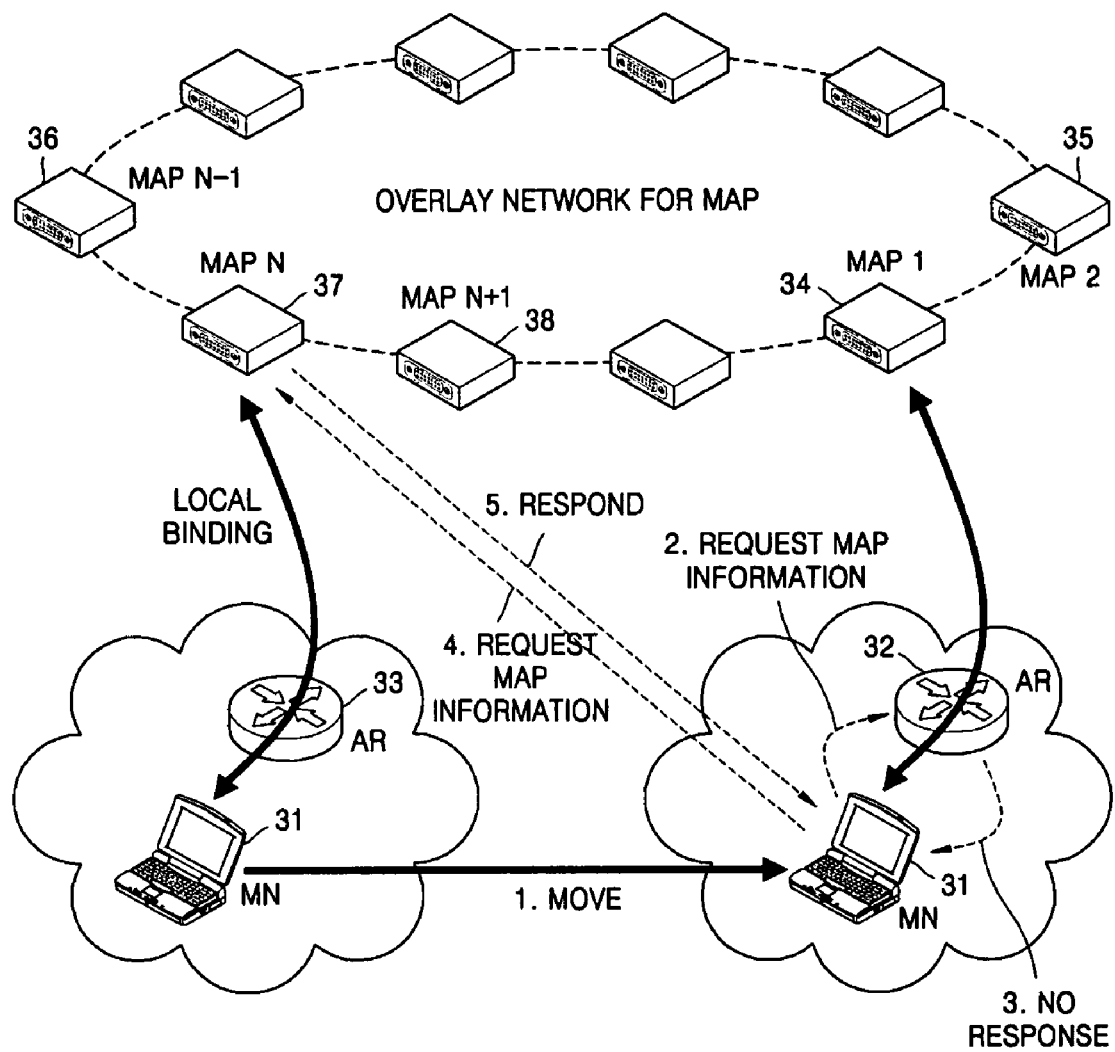
FIG. 3 shows the configuration of a first example of an HMIPv6 environment, according to an embodiment of the present invention.

FIG. 3 shows the configuration of a first example of a hierarchically configured mobile Internet protocol version 6 (HMIPv6) environment, according to an embodiment of the present invention. Referring to FIG. 3, the first exemplary HMIPv6 environment comprises a mobile node 31, access routers 32 and 33, and a plurality of mobile anchor points (MAPs) 34 through 38. Here, the mobile node 31 is a node that travels between subnets. The access routers 32 and 33 are in charge of connecting the mobile node 31 located in any of subnets under their management to external nodes outside the subnets. MAPs 34 through 38 are local agents that represent the mobile node 31 in a predetermined area that contains a plurality of subnets.

The mobile node 31 moves to a subnet managed by the access router 32 from a subnet managed by the access router 33. At this time, the mobile node 31 requests information regarding a MAP (hereinafter, MAP information) from the access router 32 that manages the subnet where the mobile node 31 is now located. If the access router 32 does not support HMIPv6-based functions, that is, does not include the MAP information, the mobile node 31 requests the MAP information from MAP N 37 that was previously connected with the mobile node 31. All the MAPs 35 through 38 are expected to constitute an overlay network where the MAPs share their MAP information with each other.

Figure 4:
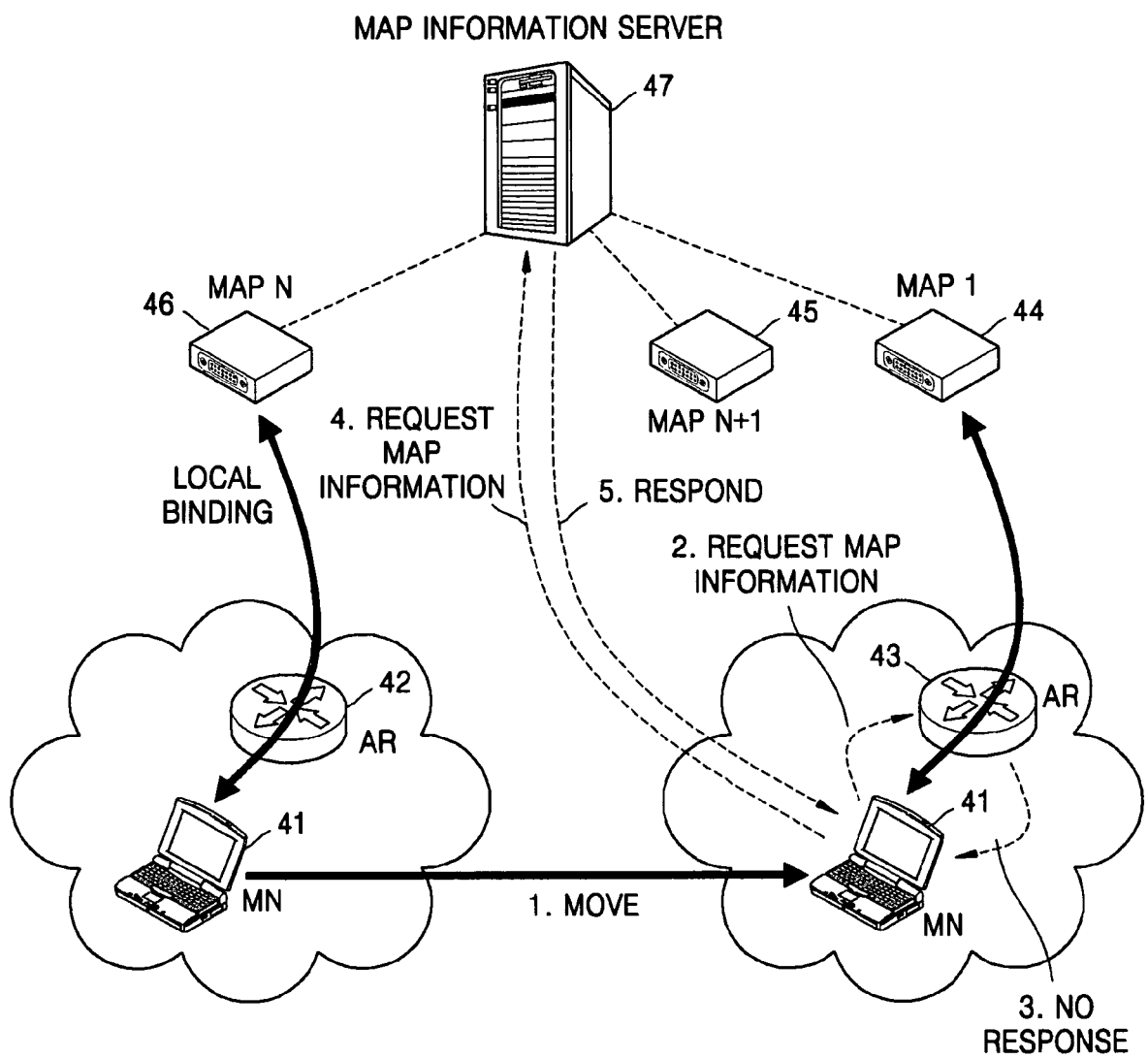
FIG. 4 shows the configuration of a second example of an HMIPv6 environment, according to an embodiment of the present invention.

FIG. 4 shows the configuration of a second example of a HMIPv6 environment, according to an embodiment of the present invention. Referring to FIG. 4, the second exemplary HMIPv6 environment comprises a mobile node 41, access routers 42 and 43, a plurality of MAPs 44 through 46, and a MAP information server 47. In this embodiment, the mobile node 41 is a node that travels between subnets. The access routers 42 and 43 are each in charge of connecting the mobile node 41 in subnets under their management to external nodes outside the subnets. The MAPs 44 through 46 are local agents that are each representative of the mobile node 41 within a predetermined area that contains a plurality of subnets. The MAP information server 47 has information regarding MAPs 44 through 46.

The mobile node 41 moves from the subnet managed by the access router 42 to another subnet managed by the access router 43. At this time, the mobile node 41 requests MAP information from the access router 43 that manages the subnet where the mobile node 41 is now located. If the access router 43 does not support HMIPv6-based functions, that is, does not include the MAP information, the mobile node 41 requests the MAP information from the MAP information server 47.

Figure 5:
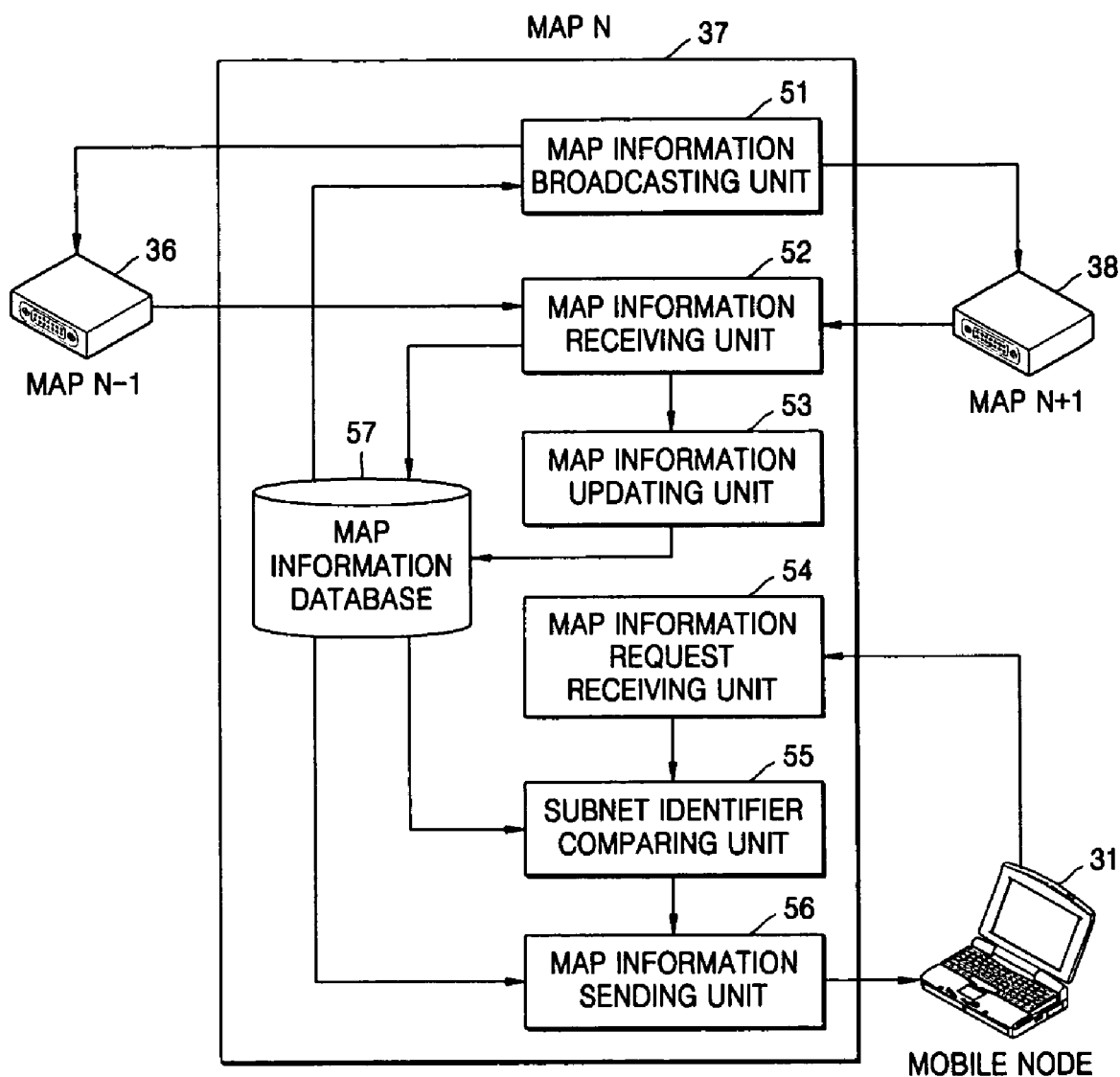
FIG. 5 is a block diagram illustrating the MAP N 37 of FIG. 3.

FIG. 5 is a block diagram of the MAP N 37 of FIG. 3. Referring to FIG. 5, the MAP N 37 comprises a MAP information broadcasting unit 51, a MAP information receiving unit 52, a MAP information updating unit 53, a MAP information request receiving unit 54, a subnet identifier comparing unit 55, a MAP information sending unit 56, and a MAP information database 57.

The MAP information broadcasting unit 51 periodically broadcasts the MAP information to other MAPs on the same overlay network. Since a MAP is a type of router fixed on the overlay network, information about the MAP is not likely to be changed. Therefore, the MAP information broadcasting unit 51 does not need to broadcast the MAP information at very short intervals, but at a reasonable interval taking into consideration the network traffic.

In the embodiment of the current invention, the MAP information includes not only the IP address of the MAP N 37 and identifiers of subnets in the area covered by the MAP N 37, but also IP addresses of all other MAPs in the same overlay network and identifiers of subnets in areas covered by the other MAPs. Through the MAP information broadcasted by the MAP information broadcasting unit 51, the other MAPs come to know the IP address of the MAP N 37 and the identifiers of subnets in the area covered by the MAP N 37.

Figure 6:
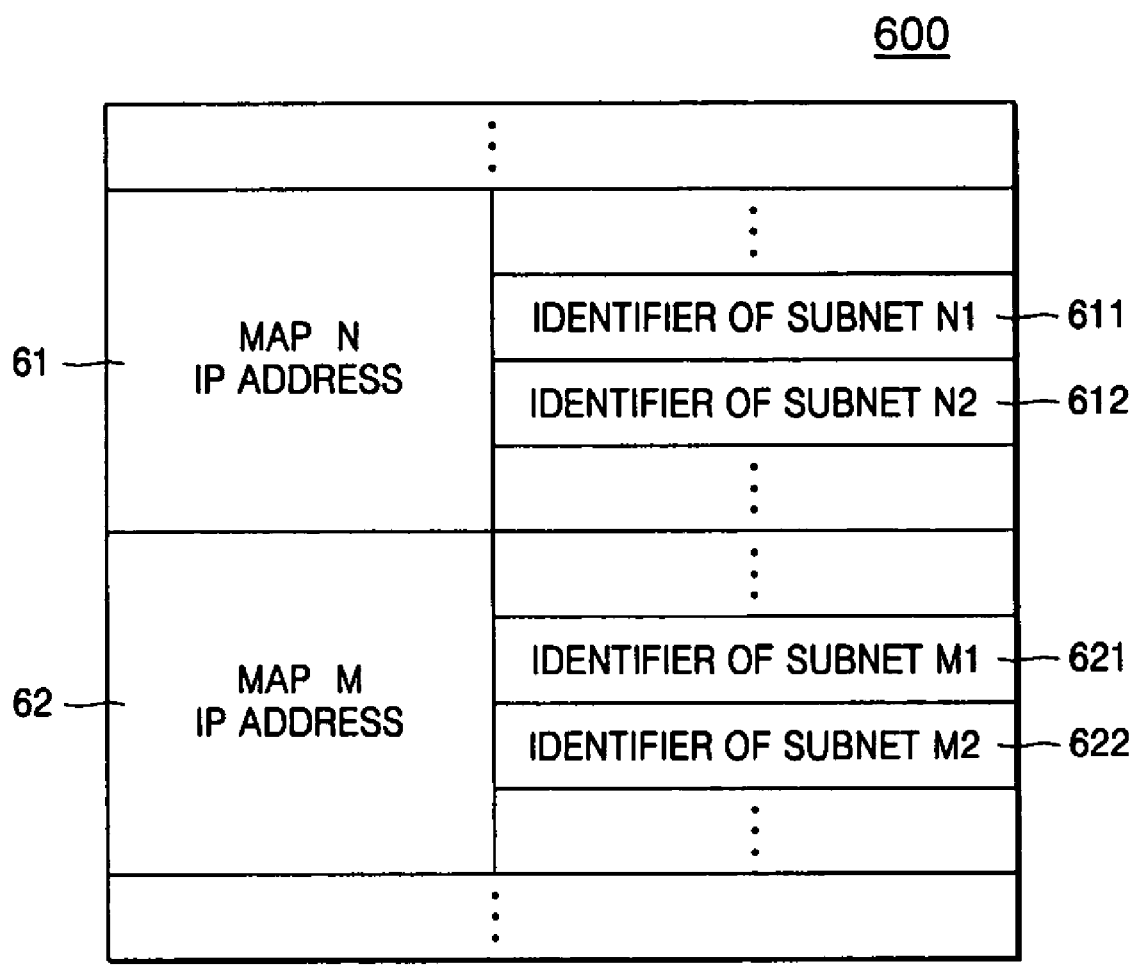
FIG. 6 shows the format of an MAP information table, according to an embodiment of the present invention.

FIG. 6 shows the format of a MAP information table, according to an embodiment of the present invention. Referring to FIG. 6, the MAP information table 600 comprises entries of MAP IP addresses 61 and 62, and entries of subnet identifiers 611, 612, 621, and 622. The IP address of the MAP N is mapped to identifiers of subnet N1 611 and subnet N2 612, and the IP address of the MAP M is mapped to identifiers of subnet M1 621 and subnet M2 622.

Referring back to FIG. 5, the MAP information database 57 contains the MAP information table 600 of FIG. 6. The MAP information broadcasting unit 51 broadcasts items of the MAP information database 57 that have been changed to the other MAPs on the overlay network.

The MAP information receiving unit 52 receives the MAP information that the other MAPs on the overlay network broadcast.

The MAP information updating unit 53 uses the MAP information received by the MAP information receiving unit 52 to update the MAP information stored in the MAP information database 57. Here, the MAP information received by the MAP information receiving unit 52 includes changes to the MAP information table 600 stored in the MAP information database 57, and the MAP information updating unit 53 reflects the changes in the MAP information table 600. Through this updating process, all the MAPs on the overlay network can share the latest MAP information with each other.

The MAP information request receiving unit 54 receives a request for the MAP information from the mobile node 31. Referring back to FIG. 3, such a request for the MAP information may occur if the access router 32 connected to the mobile node 31 does not support HMIPv6-based functions, that is, does not include any MAP information.

The subnet identifier comparing unit 55 compares a subnet identifier included in the IP address of the mobile node 31 with a subnet identifier registered in the MAP information table 600 of the MAP information database 57. In other words, the subnet identifier comparing unit 55 compares the identifier of the subnet where the mobile node 31 is now located, with subnet identifiers registered in the MAP information table 600.

Based on the comparison, if the same identifier as that of the subnet where the mobile node 31 is now located is found in the MAP information table 600, the MAP information sending unit 56 sends the MAP information that includes a MAP IP address, which is mapped into the identifier in the MAP information table 600, to respond to the request from the mobile node 31, which is received by the MAP information request receiving unit 54.

Figure 7:
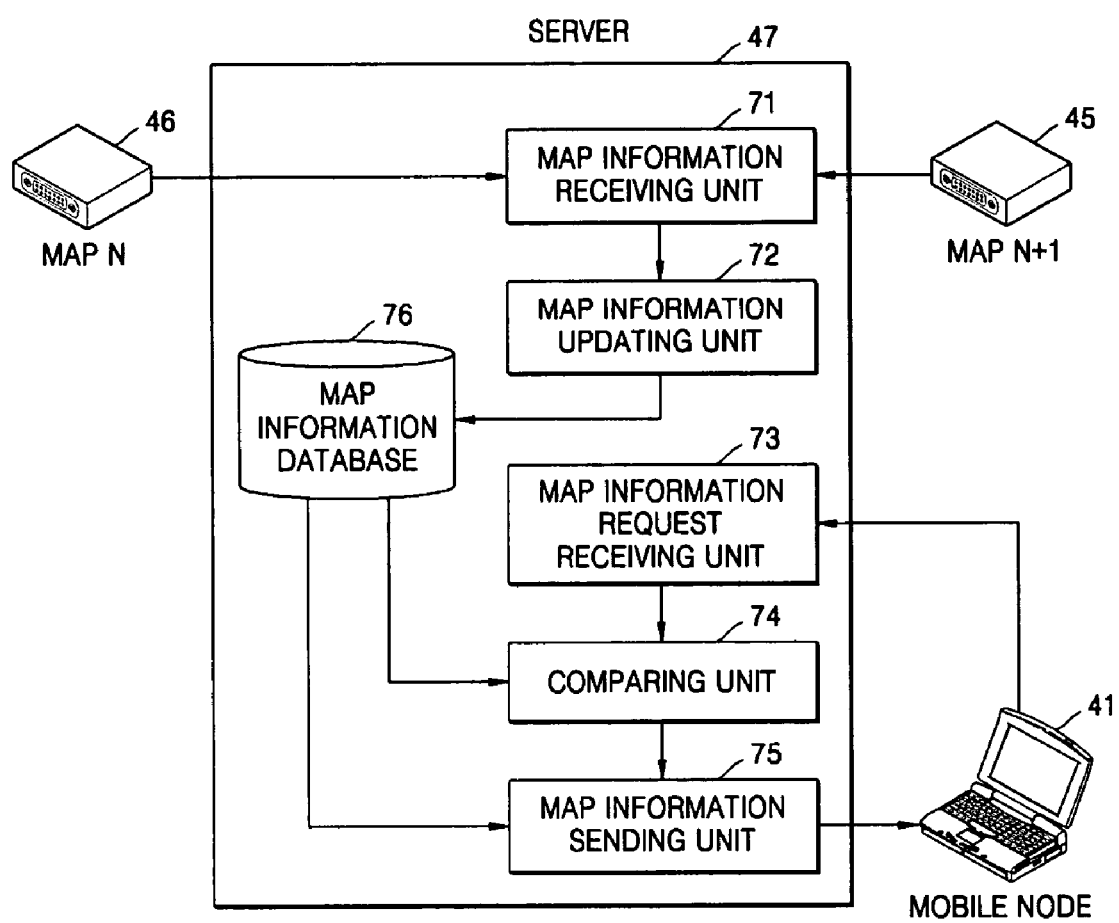
FIG. 7 is a block diagram illustrating the MAP information server 47 of FIG. 4.

FIG. 7 is a block diagram of the MAP information server 47 of FIG. 4. Referring to FIG. 7, the MAP information server 47 comprises a MAP information receiving unit 71, a MAP information updating unit 72, a MAP information request receiving unit 73, a subnet identifier comparing unit 74, a MAP information sending unit 75, and a MAP information database 76.

The MAP information receiving unit 71 receives MAP information periodically broadcasted by other MAPs.

The MAP information updating unit 72 uses the MAP information received by the MAP information receiving unit 71 to update the MAP information stored in the MAP information database 76. Here, the MAP information received by the MAP information receiving unit 71 includes changes to the MAP information table 600 stored in the MAP information database 76, and the MAP information updating unit 72 reflects the changes in the MAP information table 600.

The MAP information request receiving unit 73 receives the request for MAP information from the mobile node 41. In the case where the access router 43 connected with the mobile node 41 does not support HMIPv6-based functions, or does not contain any MAP information, the mobile node 41 requests the MAP information.

When the MAP information request is received by the MAP information receiving unit 71, the subnet identifier comparing unit 74 compares the subnet identifier contained in the IP address of the mobile node 41 with subnet identifiers registered in the MAP information table 600 of the MAP information database 76. In other words, the subnet identifier comparing unit 74 compares the identifier of the subnet where the mobile node 41 is now located, with subnet identifiers registered in the MAP information table 600 of the MAP information database 76.

Based on the comparison, if there is the same identifier in the MAP information table 600 as that of the subnet where the mobile node 41 is now located, the MAP information sending unit 75 sends the MAP information containing the MAP IP address, which is mapped to the identifier, in response to the request from the mobile node 41.

Figure 8:
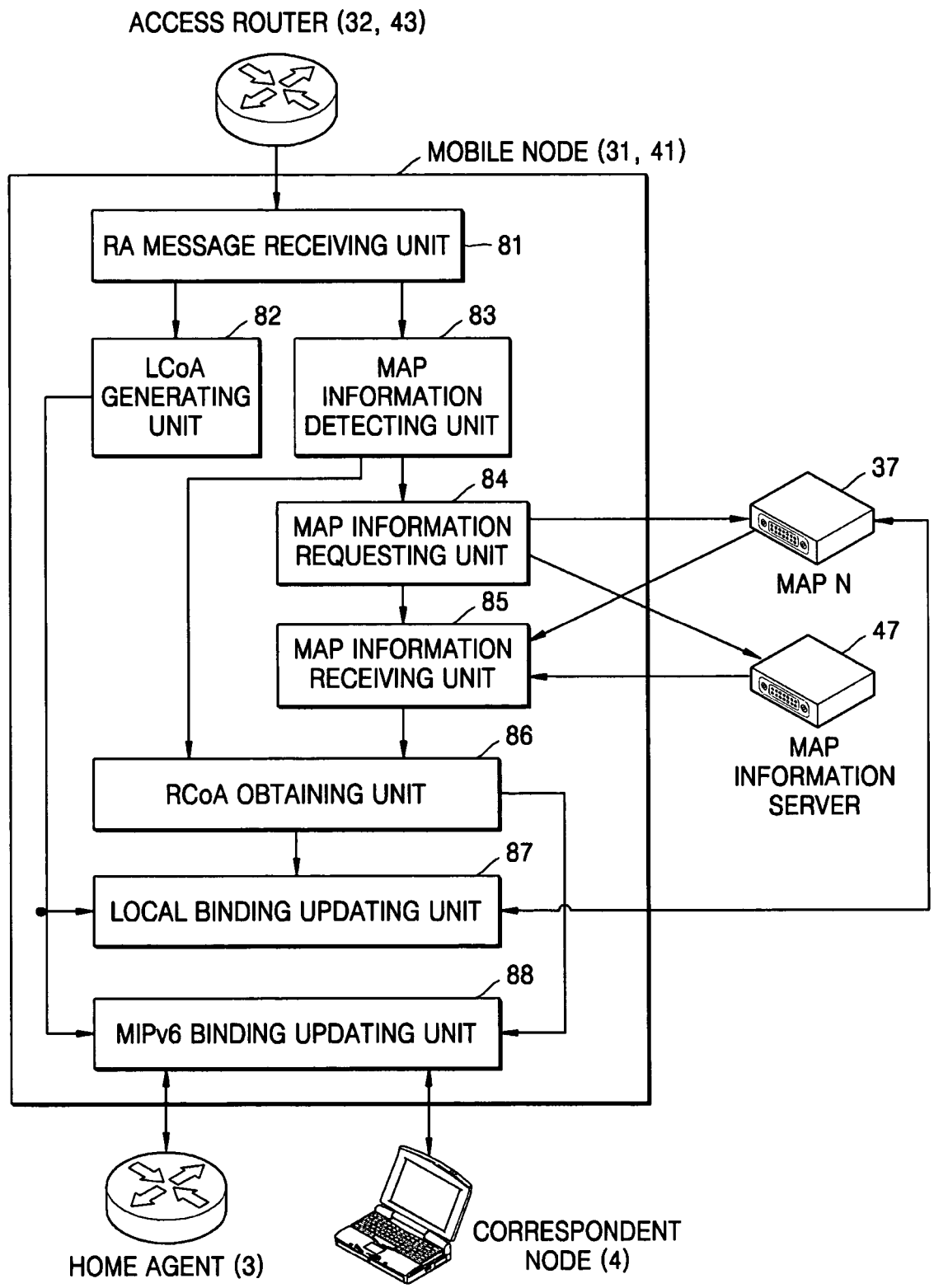
FIG. 8 is a block diagram illustrating the mobile node 31 or 41 of FIG. 3 or FIG. 4.

FIG. 8 is a block diagram of the mobile node 31 or 41 of FIG. 3 or 4, respectively. Referring to FIG. 8, the mobile node 31, 41 comprises a router advertisement (RA) message receiving unit 81, a local care of address (LCoA) generation unit 82, a MAP information detection unit 83, a MAP information requesting unit 84, a MAP information receiving unit 85, a regional care of address (RCoA) obtaining unit 86, a local binding updating unit 87, and an MIPv6 binding updating unit 88.

The RA message receiving unit 81 receives a RA message from the access router 32, 43 of the subnet where the mobile node 31, 41 is now located. The access router 32, 43 broadcasts the RA message to nodes in the subnet managed by the access router 32, 43 to notify the nodes of information regarding the subnet, for example, a subnet identifier.

If the subnet identifier in the RA message received by the RA message receiving unit 81 is different from the subnet identifier of the mobile node 31, 41, that is, if the mobile node 31, 41 has moved to another subnet, the LCoA generating unit 82 combines the subnet identifier in the RA message and a MAC address of the mobile node 31, 41, to generate an LCoA to be used in the subnet where the mobile node 31, 41 is now located.

Also, if the subnet identifier in the RA message is different from the subnet identifier of the mobile node 31, 41, that is, the mobile node has moved to another subnet, the MAP information detecting unit 83 detects information about a MAP that is representative of the mobile node 31, 41 in a predetermined area from the RA message received by the RA message receiving unit 81. If the access router 32, 43 supports HMIPv6-based functions, that is, includes MAP options, the MAP information detecting unit 83 will be able to detect the MAP information. Otherwise, if the access router 32, 43 does not support HMIPv6-based functions, meaning that the access router 32, 43 does not include any MAP options, the MAP information detecting unit 83 will not be able to detect the MAP information.

The MAP information requesting unit 84 requests MAP information from a node other than the access router 32, 43 if the MAP information is not detected by the MAP information detecting unit 83. According to the first HMIPv6 environment of FIG. 3, the MAP information requesting unit 84 requests the MAP information from the MAP N 37 that was previously connected with the mobile node 31. Also, according to the second HMIPv6 environment of FIG. 4, the MAP information requesting unit 84 requests MAP information from the MAP information server 47 containing information regarding all the MAPs.

The MAP information receiving unit 85 receives information regarding MAP 1 34 or 44 as a response to the request by the MAP information requesting unit 84, which is representative of the mobile node 31 or 41 in the area including the subnet where the mobile node 31 or 41 is located.

The RCoA obtaining unit 86 obtains a RCoA from the detected MAP information when the MAP information detecting unit 83 detects the MAP information, or obtains the RCoA from the MAP information received by the MAP information receiving unit 85 when the MAP information is not detected by the MAP information detecting unit 83. As such, the MAP information received by the MAP information receiving unit 85 includes the IP address of MAP 1 34 or 44, which is the RCoA. In other words, the home agent 3 or correspondent node 4 recognizes the address of the MAP, RCoA, as the mobile node's 31, 41 address, and thus the MAP can represent the mobile node 31, 41.

The local binding updating unit 87 updates the local binding, that is, the binding of MAP 1 34 or 44 and the mobile node 31, 41, if the RCoA obtained by the RCoA address obtaining unit 86 is the previous RCoA (i.e., if there is no change of the MAP) though there has been a move of the mobile node 31, 41. Since this falls within the case where only the LCoA is changed, the local binding updating unit 87 sends a binding update message to map the IP address of the mobile node 31, 41 to the IP address of the MAP 1 34 or 44, and then receives a binding acknowledgement message from the MAP 1 34 or 44.

The MIPv6 binding updating unit 88 updates the MIPv6-based binding, that is, the binding of the mobile node 31, 41 and the home agent 3, if the RCoA obtained from the RCoA address obtaining unit 86 is different from the previous RCoA (i.e., if the MAP has been changed when the mobile node 31, 41 moved). Since this comes under the case where the RCoA, the IP address of the mobile node 31, 41 as viewed from the home agent 3 or the correspondent node 4, is changed, the MIPv6 binding updating unit 88 sends the binding update message to the home agent 3 or the correspondent node 4, and then receives the acknowledgement message from them.

Figure 9:
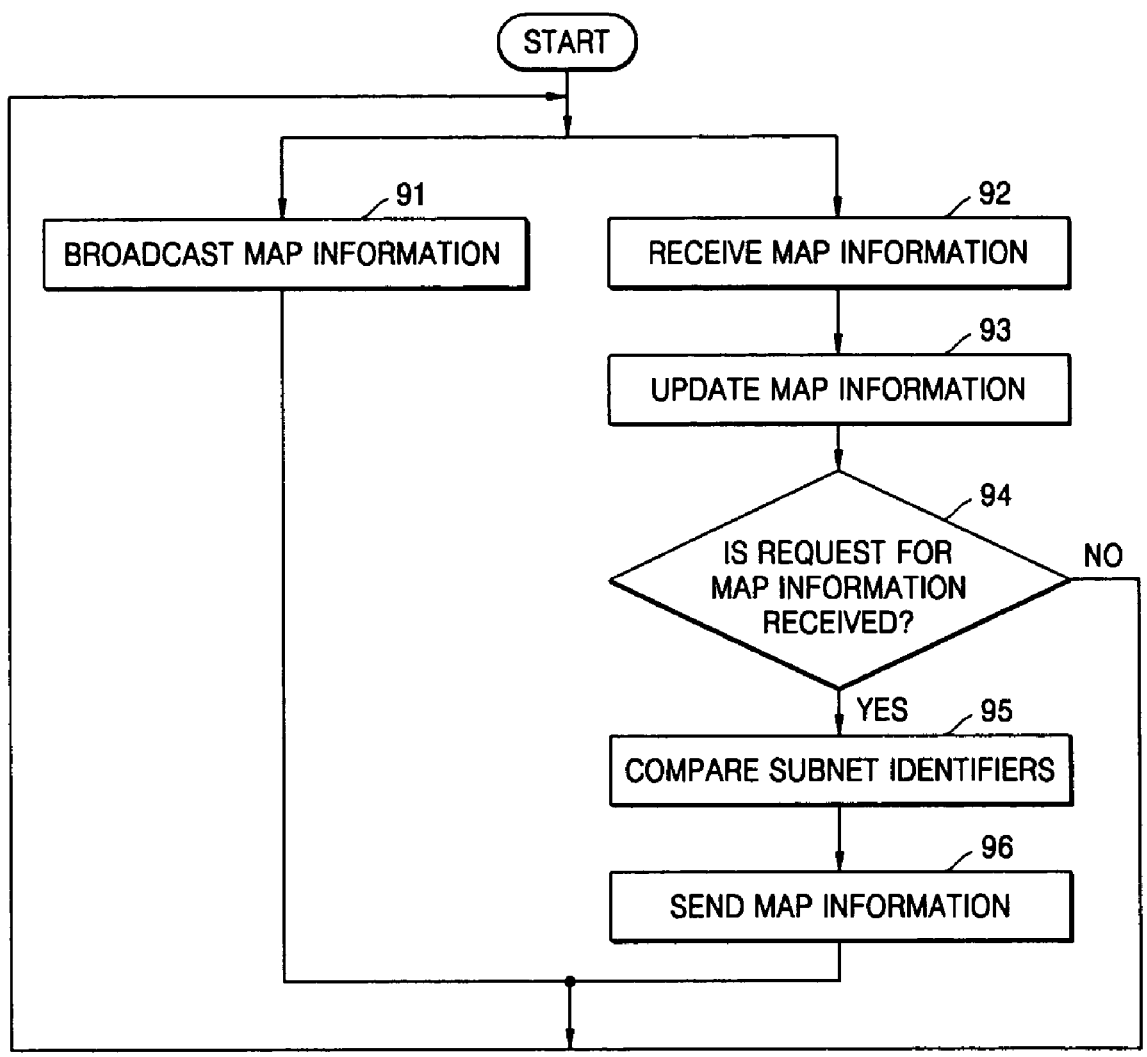
FIG. 9 is a flowchart illustrating a method of providing MAP information in the first exemplary HMIP6 environment, according to an embodiment of the present invention.

FIG. 9 is a flowchart that illustrates a method of providing MAP information in the first exemplary HMIPv6 environment, according to the embodiment of the invention illustrated in FIG. 3. The method comprises a plurality of operations that are time-analytically processed by the MAP N 37 of FIG. 5. Therefore, the substance of the MAP N 37 as mentioned above can be true for this embodiment, even though some aspects may not be mentioned again.

In operation 91, the MAP N 37 periodically broadcasts MAP information to other MAPs in the overlay network. In operation 92, the MAP N 37 receives MAP information from the other MAPs in the overlay network, each of which is also periodically broadcasting its own MAP information. In operation 93, the MAP N 37 uses the received MAP information to update the MAP information stored in its MAP information database 57.

In operation 94, the MAP N 37 receives a request from the mobile node 31 for the MAP information. In operation 95, upon receiving the request, the MAP N 37 compares the subnet identifier contained in the IP address of the mobile node 31 that sends the request, with the subnet identifiers registered in the MAP information table in the MAP information database 57.

If the comparison result indicates that the identifier in the MAP information table 600 is the same as that of the subnet where the mobile node 31 is now located, in operation 96, the MAP N 37 sends the MAP information containing the MAP IP address mapped to the subnet identifier, as a response to the request received in operation 94.

Figure 10:
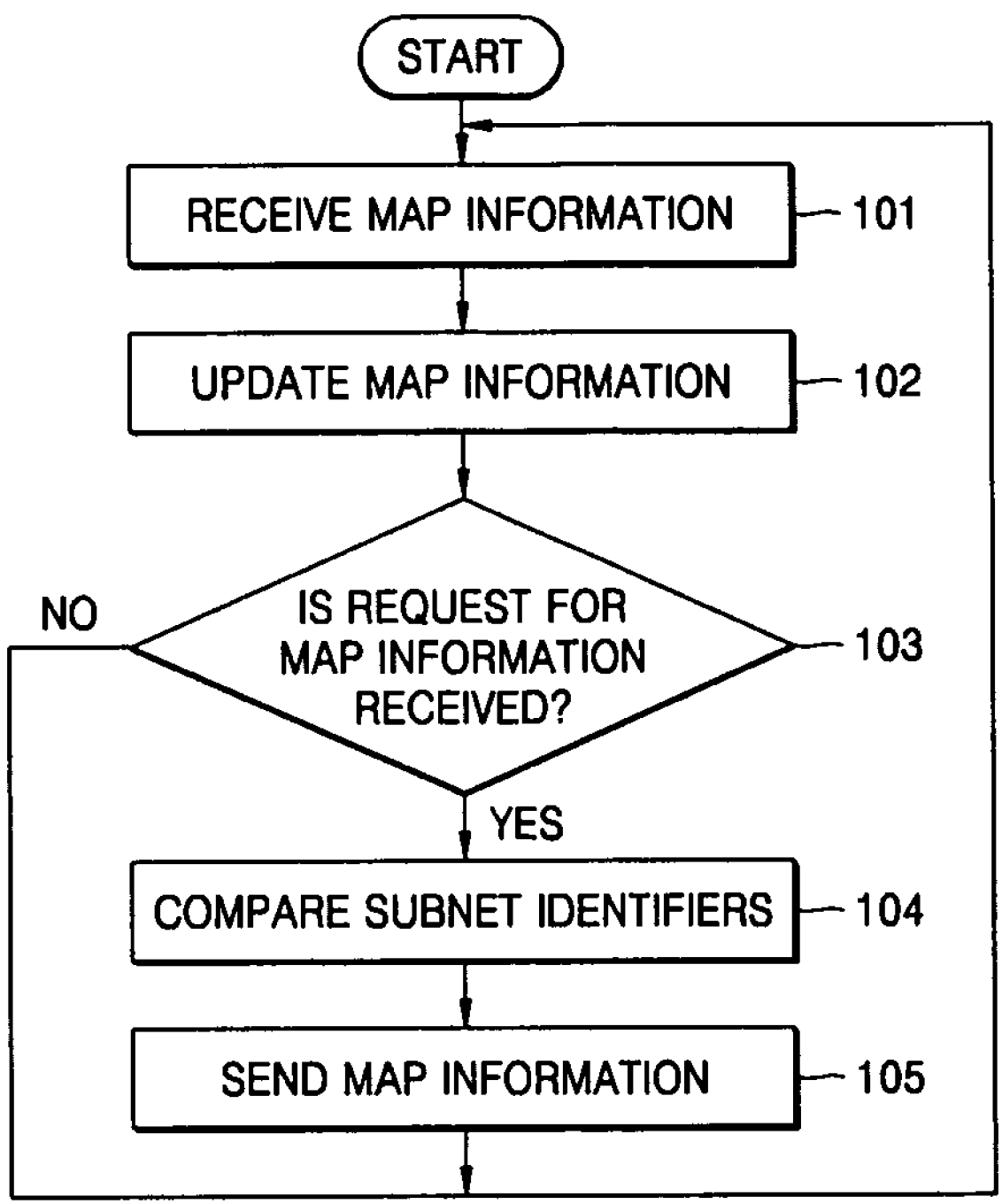
FIG. 10 is a flowchart illustrating a method of providing MAP information in the second exemplary HMIPv6 environment, according to an embodiment of the present invention.

FIG. 10 is a flowchart that illustrates a method of providing MAP information in the second exemplary HMIPv6 environment, according to an embodiment of the present invention as illustrated in FIG. 4. Referring to FIG. 10, the method comprises a plurality of operations that are time-analytically processed by the MAP information server 47. Therefore, the substance of the MAP information server 47 as mentioned above can also be true for this embodiment, even though some aspects may not be mentioned again.

In operation 101, the MAP information server 47 receives MAP information periodically broadcasted by MAPs 44 through 46. In operation 102, the MAP information server 47 uses the received MAP information to update the MAP information stored in the MAP information database 76.

In operation 103, the MAP information server 47 receives a request from the mobile node 41 for the MAP information. After receiving the request for the MAP information, the MAP information server 47 compares the subnet identifier contained in the IP address of the mobile node 41 that sent the request for the MAP information, with subnet identifiers registered in the MAP information table 600 of its MAP information database 76.

If the comparison result turns out that there is the same identifier in the MAP information table 600 as that of the subnet where the mobile node 41 is now located, in operation 105, the MAP information sending unit 75 of the MAP information server 47 sends the MAP information containing the MAP IP address mapped to the subnet identifier, as a response to the request received by the MAP information request receiving unit 73.

Figure 11:
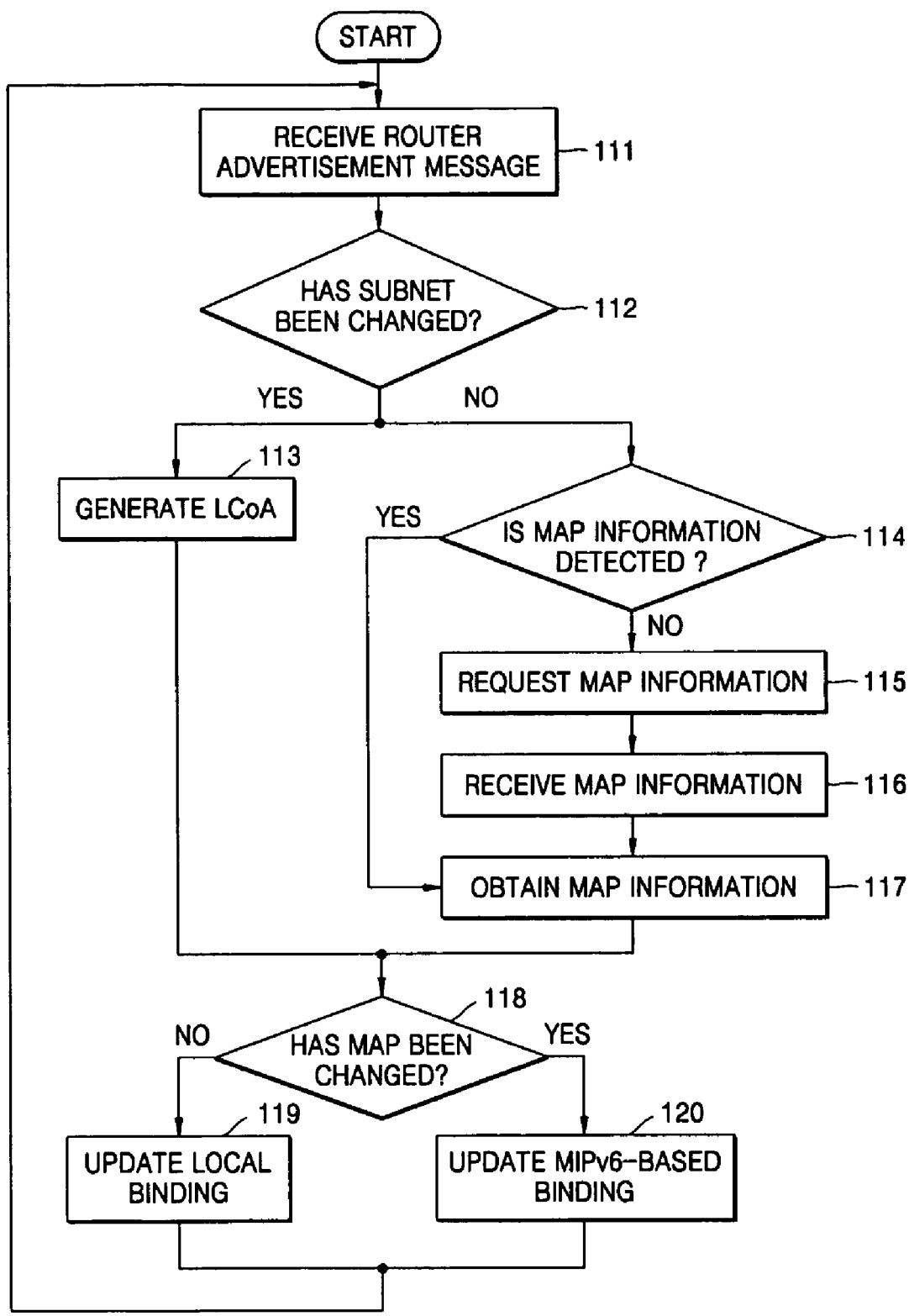
FIG. 11 is a flowchart illustrating a method of obtaining MAP information, according to an embodiment of the present invention.

FIG. 11 is a flowchart that illustrates a method of obtaining MAP information, according to an embodiment of the present invention. Referring to FIG. 11, the method comprises a plurality of operations that are time-analytically processed by the mobile node 31, 41 of FIG. 8. Therefore, the substance of the mobile node 31, 41 as mentioned above can be true for this embodiment, even though some aspects may not be mentioned again.

In operation 111, the mobile node 31, 41 receives a RA message from the access router 32, 43 of the subnet where the mobile node 31, 41 is now located. In operation 112, the mobile node 31, 41 determines whether the subnet identifier in the received RA message is the same as the previous subnet identifier, that is, whether the subnet has been changed or not.

If it is determined in the operation 112 that the subnet has been changed, then in operation 113, the mobile node 31, 41 combines the subnet identifier contained in the RA message received in operation 111 and a MAC address of the mobile node 31, 41, to generate an LCoA to be used in the subnet where the mobile node 31, 41 is now located.

If it is determined in the operation 112 that the subnet has not been changed, then in operation 114, the mobile node 31, 41 detects the MAP information from the RA message received in operation 111, where the MAP 1 34, 44 is representative of the mobile node 31, 41 in a predetermined area.

If the MAP information is not detected in operation 114, the mobile node 31, 41 requests the MAP information from nodes other than the access router 32, 43. According to the first exemplary HMIPv6 environment of FIG. 3, in operation 115, the mobile node 31 requests MAP information from MAP N 37 that the mobile node 31 was previously connected to. Also, according to the second exemplary HMIPv6 environment of FIG. 4, the mobile node 41 requests MAP information from the MAP information server 47 that includes information on all the MAPs.

In operation 116, as a response to the request in operation 115, the mobile node 31, 41 receives information about the MAP that is representative of the mobile node 31, 41 in the area that contains the subnet where the mobile node 31, 41 is now located.

If the information about the MAP is detected in operation 114, the mobile node 31, 41 obtains a RCoA from the MAP information. Otherwise, if the MAP information is not detected in operation 114, the mobile node 31, 41 obtains the RCoA from the MAP information received in operation 116.

In operation 118, the mobile node 31, 41 determines whether the RCoA obtained in operation 117 is the same as the previous RCoA, or whether the MAP has been changed.

If it is determined in operation 118 that both the current and previous RCoA are the same, meaning that the MAP has not been changed, the mobile node 31, 41 updates the local binding, that is, the binding of the mobile node 31, 41 with the MAP 1 34, 44, in operation 119.

If it is determined in operation 118 that the current RCoA is different from the previous RCoA, meaning that the MAP has been changed, the mobile node 31, 41 updates the MIPv6 based binding, that is, the binding of the mobile node 31, 41 and the home agent 3, in operation 120.

It is possible for the embodiments described above according to the present invention to be implemented as a computer program. Codes and code segments constituting the computer program may readily be inferred by those skilled in the art. The computer programs may be recorded on computer-readable media in order to be read and executed by computers. Such computer-readable media include all kinds of storage devices, such as magnetic storage devices, optical data storage devices, etc. The computer-readable media also include everything that is realized in the form of carrier waves, e.g., an Internet transmission.

According to aspects of the present invention, even if the access router does not support HMIPv6-based functions, the mobile node can obtain information about the current MAP from the MAP previously connected with the mobile node, or from the MAP information server. In other words, even if the access router does not support HMIPv6-based functions, the mobile node can obtain information about the MAP suitable for the current position of the mobile node, thereby maintaining the mobility of the mobile node anywhere.

In addition, according to aspects of the present invention, since a plurality of MAPs that constitute the overlay network or the MAP information server contains information on all the MAPs, the mobile node can find at once information about the MAP suitable for the current position of the mobile node. Further, according to aspects of the present invention, the mobility of the mobile node can be guaranteed without replacing the access router in use with an HMIPv6-based access router.

While this invention has been particularly shown and described with reference to preferred embodiments thereof, it will be understood by those skilled in the art that various changes in form and details may be made therein without departing from the spirit and scope of the invention as defined by the appended claims.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of supporting mobility of a mobile node within a predetermined area including a plurality of subnets in a wireless network, comprising:
   receiving, when the mobile node moves from one subnet to another subnet managed by an access router within the predetermined area of the wireless network, a message from the access router;
   detecting, at the mobile node, information regarding a mobile anchor point (MAP) that serves as a local agent in the predetermined area of the wireless network to represent the mobile node in the predetermined area, from the message;
   requesting, at the mobile node, MAP information from a designated MAP within the predetermined area of the wireless network when the MAP information is not detected from the message from the access router, the designated MAP being distinct from the access router; and
   obtaining, at the mobile node, the MAP information so as to inform an address of the mobile node within the predetermined area of the wireless network.

2. The method of claim 1, wherein if the MAP information is not detected from the message, the MAP information is further requested from another MAP in the predetermined area.

3. The method of claim 2, wherein the designated MAP and the other MAPs are connected in an overlay network, and share the information with each other.

4. The method of claim 1, wherein the designated MAP is a MAP information server located in the predetermined area to store MAP information of all available MAPs in the predetermined area of the wireless network.

5. The method of claim 1, further comprising:
   on the basis of the MAP information obtained, selectively performing, at the mobile node, a binding update and a binding acknowledgement with the designated MAP so as to inform the address of the mobile node within the predetermined area of the wireless network.

6. The method of claim 5, wherein the MAP information contains an IP address of the designated MAP.

7. The method of claim 1, wherein the designated MAP serves as a local agent in a Hierarchical Mobile IPv6 (HMIPv6) based Mobile Anchor Point (MAP) environment, and wherein the MAP information is only detected from the access router when the access router supports HMIPv6-based functions.

8. A non-transitory computer-readable medium comprising instructions that, when executed by a mobile node in a wireless network, perform a method of supporting mobility of the mobile node in a predetermined area having a plurality of subnets of the wireless network, comprising:
   detecting, when the mobile node moves from one subnet to another subnet managed by an access router within the predetermined area of the wireless network, information regarding a mobile anchor point (MAP) that serves as a local agent in the predetermined area of the wireless network to represent the mobile node in the predetermined area, from a message from the access router;
   requesting MAP information from a designated MAP within the predetermined area of the wireless network when the MAP information is not detected from the message, the designated MAP being distinct from the access router; and
   obtaining the MAP information so as to inform an address of the mobile node within the predetermined area of the wireless network.

9. A mobile node moving from one subnet to another subnet within a predetermined area of a wireless network, the mobile node comprising:
   an information detecting unit arranged to detect information regarding a mobile anchor point (MAP) that serves as a local agent that is representative of the mobile node in the predetermined area of the wireless network, from a message from an access router that manages the subnet where the mobile node is located;
   an information requesting unit arranged to request MAP information from a designated MAP within the predetermined area of the wireless network when the MAP information is not detected from the message, the designated MAP being distinct from the access router; and
   an information obtaining unit arranged to obtain the MAP information so as to inform an address of the mobile node within the predetermined area of the wireless network.

10. A method of providing information for use by a mobile node for seamless mobility within a predetermined area including a plurality of subnets in a wireless network, comprising:
    receiving a request from the mobile node for information regarding a mobile anchor point (MAP) that serves as a local agent in the predetermined area of the wireless network that is representative of the mobile node in the predetermined area of the wireless network, as the mobile node moves from one subnet to another subnet managed by an access router within the predetermined area of the wireless network, the request being received from the mobile node when the mobile node is not able to detect the MAP information from the access router; and
    sending MAP information to the mobile node from the MAP in response to the request so as to enable the mobile node to notify an address of the mobile node within the predetermined area of the wireless network, wherein the MAP is distinct from the access router.

11. The method of claim 10,
    wherein the MAP information includes an IP address of the MAP serving as the local agent and identifiers of the different subnets within the predetermined area of the wireless network, such that an identifier of the subnet where the mobile node is now located is compared with stored identifiers of different subnets, when the request is received, and
    wherein the MAP information being sent to the mobile node includes an IP address mapped to the identifier of the subnet where the mobile node is now located.

12. The method of claim 10, wherein the MAP serves as the local agent in a hierarchical MIPv6 (HMIPv6)-based mobile anchor point (MAP) environment, and wherein the request for the information regarding the MAP is processed when an access router connected to the mobile node does not support the HMIPv6-based functions.

13. A non-transitory computer-readable medium storing a program that, when executed by a mobile node in a wireless network, performs a method of supporting mobility of the mobile node in a predetermined area including a plurality of subnets of the wireless network, the method comprising:

receiving a request from the mobile node for information regarding a mobile anchor point (MAP) that serves as a local agent in the predetermined area of the wireless network that is representative of a mobile node in the predetermined area of the wireless network, as the mobile node moves from one subnet to another subnet managed by an access router within the predetermined area of the wireless network, the request being received from the mobile node when the mobile node is not able to detect the MAP information from the access router; and sending MAP information to the mobile node from the MAP in response to the request so as to enable the mobile node to notify an address of the mobile node within the predetermined area of the wireless network, wherein the MAP is distinct from the access router.

14. A mobile anchor point (MAP) located in a predetermined area including a plurality of subnets of a wireless network, the MAP comprising:

a request receiving unit arranged to receive a request from a mobile node that moves from one subnet to another subnet managed by an access router within the predetermined area of the wireless network, for information regarding a MAP that serves as a local agent that is representative of the mobile node in the predetermined area of the wireless network, the request receiving unit to receive the request from the mobile node when the mobile node is not able to detect the MAP information from the access router; and an information sending unit arranged to send the MAP information to the mobile node in response to the request so as to enable the mobile node to notify an address of the mobile node within the predetermined area of the wireless network, wherein the MAP is distinct from the access router.

15. A system to support movement of a mobile node in a predetermined area including a plurality of subnets in a wireless network, comprising:

a plurality of mobile anchor points (MAPs) arranged at different locations in the predetermined area of the wireless network, each MAP controlling communication for the mobile node within a corresponding subnet within the predetermined area of the wireless network; and a plurality of access routers each installed at the corresponding subnet to manage the corresponding subnet and to process communication between the mobile node and one of the mobile anchor points (MAPs) when the mobile node moves into the corresponding subnet, the MAPs being distinct from the access routers, wherein, when the mobile node moves into the corresponding subnet, the mobile node sends a request for information regarding a MAP from the access router installed at the corresponding subnet and, if the access router does not include MAP information, sends another request for MAP information to a MAP that was previously connected with the mobile node in order to inform an address of the mobile node within the predetermined area of the wireless network.

16. The system of claim 15, wherein the MAP that was previously connected with the mobile node contains a MAP information database of entries of MAP IP addresses that are mapped with entries of subnet identifiers to identify all the subnets available in the predetermined area of the wireless network and to identify a subnet identifier included in the IP address of the mobile node.

17. The system of claim 15, further comprising:
a MAP server located in the predetermined area of the wireless network, to store identification information for each of the MAPs available in the wireless network.

18. The system of claim 17, wherein the mobile node receives the identification information from the MAP server.

19. The system of claim 16, wherein the mobile node, when the mobile node moves into the corresponding subnet, sends a binding update to a home agent (HA) or a corresponding node (CN) in the wireless network to inform an address of the mobile node within the predetermined area of the wireless network.

20. The system of claim 15, wherein the MAP communicates according to a hierarchical MIPv6 (HMIPv6) standard.

21. The system of claim 15, wherein the mobile node compares a subnet identifier of the access router installed at the corresponding subnet with a subnet identifier of the mobile node to determine whether the access router is in compliant with a hierarchical MIPv6 (HMIPv6) standard.

22. The system of claim 15, wherein the mobile node requests identification information from the access router installed at the corresponding subnet when a subnet identifier of the access corresponds to a subnet identifier of the mobile node.

23. The system of claim 22, wherein the mobile node uses identification information from the MAP that was previously connected with the mobile node, when the subnet identifier of the access router does not correspond to a subnet identifier of the mobile node.

24. The system of claim 22, further comprising:
a mobile anchor point (MAP) server arranged to store the identification information for each of the MAPs available in the wireless network.

25. The system of claim 24, wherein the mobile node uses identification information from the MAP that was previously connected with the mobile node, when the subnet identifier of the access router does not correspond to a subnet identifier of the mobile node.

26. The system of claim 17, wherein the MAP server further comprises:
a MAP table including entries of MAP IP addresses that are mapped with entries of subnet identifiers to identify all the subnets available in the predetermined area of the wireless network and to identify a subnet identifier included in the IP address of the mobile node.

* * * * *